(12) United States Patent
Tate et al.

(10) Patent No.: US 10,874,982 B2
(45) Date of Patent: Dec. 29, 2020

(54) CALCIUM HYDROXIDE-CONTAINING COMPOSITIONS AND ASSOCIATED SYSTEMS AND METHODS

(71) Applicant: Graymont (PA) Inc., Bellefonte, PA (US)

(72) Inventors: Michael John Tate, Oregon, OH (US); Jared Ira Leikam, West Jordan, UT (US); Michael Roach, Salt Lake City, UT (US); Joseph Lewis, Salt Lake City, UT (US); Shiaw Tseng, Pittsburgh, PA (US)

(73) Assignee: GRAYMONT (PA) INC., Pleasant Gap, PA (US)

( * ) Notice: Subject to any disclaimer, the term of this patent is extended or adjusted under 35 U.S.C. 154(b) by 0 days.

(21) Appl. No.: 16/800,798

(22) Filed: Feb. 25, 2020

(65) Prior Publication Data
US 2020/0188846 A1 Jun. 18, 2020

Related U.S. Application Data

(63) Continuation of application No. 16/446,953, filed on Jun. 20, 2019, now Pat. No. 10,610,825, which is a
(Continued)

(51) Int. Cl.
*B01D 53/50* (2006.01)
*B01D 53/68* (2006.01)
(Continued)

(52) U.S. Cl.
CPC ........ *B01D 53/508* (2013.01); *B01D 53/685* (2013.01); *B01J 20/041* (2013.01);
(Continued)

(58) Field of Classification Search
CPC ............ B01D 53/1456; B01D 53/1475; B01D 53/1481; B01D 53/40; B01D 53/501;
(Continued)

(56) References Cited

U.S. PATENT DOCUMENTS 2,894,820 A 7/1959 Albert et al.
5,173,279 A * 12/1992 Dumont ............... B01D 53/502
252/190
(Continued)

FOREIGN PATENT DOCUMENTS

CA 2498170 C 11/2011
EP 2103338 A1 9/2009
(Continued)

OTHER PUBLICATIONS

Brunauer, Stephen et al., "Adsorption of Gases in Multimolecular Layers," Contribution from the Bureau of Chemistry and Soils and George Washington University, Feb. 1938, pp. 309-319.
(Continued)

*Primary Examiner* — Timothy C Vanoy
(74) *Attorney, Agent, or Firm* — Perkins Coie LLP

(57) ABSTRACT

Calcium hydroxide-containing compositions can be manufactured by slaking quicklime, and subsequently drying and milling the slaked product. The resulting calcium hydroxide-containing composition can have a size, steepness, pore volume, and/or other features that render the compositions suitable for treatment of exhaust gases and/or removal of contaminants. In some embodiments, the calcium hydroxide-containing compositions can include a $D_{10}$ from about 0.5 microns to about 4 microns, a $D_{90}$ less than about 30 microns, and a ratio of $D_{90}$ to $D_{10}$ from about 8 to about 20, wherein individual particles include a surface area greater than or equal to about 25 m²/g.

20 Claims, 4 Drawing Sheets

Related U.S. Application Data continuation of application No. 15/922,179, filed on Mar. 15, 2018, now Pat. No. 10,369,518.

(60) Provisional application No. 62/473,228, filed on Mar. 17, 2017.

(51) Int. Cl.

| | | |
|---|---|---|
| *B01J 20/04* | (2006.01) | |
| *B01J 20/28* | (2006.01) | |
| *B01J 20/30* | (2006.01) | |
| *C04B 2/04* | (2006.01) | |
| *C04B 2/06* | (2006.01) | |
| *C01F 11/02* | (2006.01) | |

(52) U.S. Cl.
CPC ... *B01J 20/28011* (2013.01); *B01J 20/28016* (2013.01); *B01J 20/28059* (2013.01); *B01J 20/28071* (2013.01); *B01J 20/3021* (2013.01); *B01J 20/3078* (2013.01); *C01F 11/02* (2013.01); *C04B 2/045* (2013.01); *C04B 2/06* (2013.01); *B01D 2251/404* (2013.01); *B01D 2251/604* (2013.01); *B01D 2253/112* (2013.01); *B01D 2253/304* (2013.01); *B01D 2253/306* (2013.01); *B01D 2253/311* (2013.01); *B01D 2257/2045* (2013.01); *B01D 2257/2047* (2013.01); *B01D 2257/302* (2013.01); *B01D 2257/60* (2013.01); *B01D 2258/02* (2013.01); *B01D 2258/0233* (2013.01); *B01D 2258/0283* (2013.01); *C01P 2004/51* (2013.01); *C01P 2004/61* (2013.01); *C01P 2004/62* (2013.01); *C01P 2006/12* (2013.01); *C01P 2006/14* (2013.01); *C01P 2006/16* (2013.01)

(58) Field of Classification Search
CPC .............. B01D 53/62; B01D 2251/404; B01D 2257/302; B01D 2257/504; B01D 2258/0283
See application file for complete search history.

(56) References Cited

U.S. PATENT DOCUMENTS

| | | | |
|---|---|---|---|
| 5,277,056 A | 1/1994 | Braun et al. | |
| 5,277,837 A | 1/1994 | Dumont et al. | |
| 5,435,980 A | 7/1995 | Felsvang et al. | |
| 5,705,141 A | 1/1998 | Dumont et al. | |
| 6,322,769 B1 | 11/2001 | Langelin et al. | |
| 6,685,902 B2 * | 2/2004 | Morin ................ | B01D 53/501 423/244.01 |
| 7,048,779 B1 | 5/2006 | Weyand et al. | |
| 7,141,093 B2 | 11/2006 | Charette | |
| 7,744,678 B2 | 6/2010 | Laudet et al. | |
| 7,842,265 B1 | 11/2010 | Paone | |
| 8,147,587 B2 | 4/2012 | Bansal et al. | |
| 9,517,471 B1 * | 12/2016 | Griffard ............... | B01D 53/508 |
| 9,751,043 B1 | 9/2017 | Biehn et al. | |
| 9,963,386 B1 | 5/2018 | Griffard et al. | |
| 10,046,273 B1 | 8/2018 | Biehn et al. | |
| 10,155,227 B2 * | 12/2018 | Biehn ..................... | C01F 11/02 |
| 10,307,728 B1 | 6/2019 | Griffard et al. | |
| 10,369,518 B2 | 8/2019 | Tate et al. | |
| 2002/0033097 A1 | 3/2002 | El-Shoubary et al. | |
| 2006/0048646 A1 | 3/2006 | Olson et al. | |
| 2008/0107579 A1 | 5/2008 | Downs et al. | |
| 2008/0134888 A1 | 6/2008 | Chao et al. | |
| 2009/0000349 A1 | 1/2009 | Holt et al. | |
| 2009/0098656 A1 | 4/2009 | Holt et al. | |
| 2009/0117019 A1 | 5/2009 | Comrie | |
| 2009/0158929 A1 | 6/2009 | Lindau | |
| 2009/0229462 A1 | 9/2009 | Laudet et al. | |
| 2009/0246117 A1 * | 10/2009 | Tilquin .................... | C04B 2/08 423/640 |
| 2009/0272267 A1 | 11/2009 | Nelson | |
| 2009/0297413 A1 | 12/2009 | Olson et al. | |
| 2010/0018395 A1 | 1/2010 | Srinivasachar et al. | |
| 2010/0126345 A1 | 5/2010 | Gupta et al. | |
| 2010/0212550 A1 | 8/2010 | Zhang et al. | |
| 2011/0097674 A1 | 4/2011 | Liu | |
| 2011/0250110 A1 | 10/2011 | Keiser et al. | |
| 2011/0289923 A1 | 12/2011 | Bittner et al. | |
| 2012/0100053 A1 | 4/2012 | Durham et al. | |
| 2012/0161022 A1 | 6/2012 | Thomson et al. | |
| 2012/0294769 A1 | 11/2012 | Reagan | |
| 2013/0125749 A1 | 5/2013 | Benson et al. | |
| 2013/0125750 A1 | 5/2013 | Landreth et al. | |
| 2013/0220120 A1 | 8/2013 | Liu et al. | |
| 2014/0044623 A1 | 2/2014 | Laslo | |
| 2014/0170046 A1 | 6/2014 | Schmidt et al. | |
| 2014/0245936 A1 | 9/2014 | Pollack et al. | |
| 2015/0158991 A1 | 6/2015 | Lorgouilloux et al. | |
| 2015/0217226 A1 | 8/2015 | Roark et al. | |
| 2016/0263585 A1 | 9/2016 | Filippelli et al. | |
| 2017/0001909 A1 | 1/2017 | Ulrike et al. | |
| 2018/0361393 A1 | 12/2018 | Biehn et al. | |
| 2019/0118159 A1 * | 4/2019 | Laird ................... | B01D 53/508 |
| 2019/0193049 A1 * | 6/2019 | Lorgouilloux ..... | B01J 20/28069 |
| 2019/0351368 A1 | 11/2019 | Tate | |
| 2020/0147583 A1 * | 5/2020 | Griffard .................. | C01F 11/18 |

FOREIGN PATENT DOCUMENTS

| | | | |
|---|---|---|---|
| EP | 3130562 A1 | 2/2017 | |
| JP | 4462885 B2 | 2/2010 | |
| WO | WO 9714650 A1 * | 4/1997 | ............... C04B 2/04 |
| WO | 9739991 A1 | 10/1997 | |
| WO | 2004022641 A2 | 3/2004 | |
| WO | 2017220161 A1 | 12/2017 | |
| WO | 2017220167 A1 | 12/2017 | |

OTHER PUBLICATIONS

Cibo; Boiler Operations, Maintenance and Performance Conference; Apr. 24-26, 2017; Pittsburgh, PA; 8 pages.

Filippelli, Greg, P.E., Lhoist North America; DSI With Sorbacal Hydrated Lime—The Swiss Army Knife of Emissions Control Options; Boiler Operations, Maintenance and Performance Conference; Apr. 25, 2017; Pittsburgh, PA; 24 pages.

International Search Report and Written Opinion dated Jul. 24, 2018, International Patent Application No. PCT/US2018/022618, 13 pages.

* cited by examiner

CALCIUM HYDROXIDE-CONTAINING COMPOSITIONS AND ASSOCIATED SYSTEMS AND METHODS

CROSS-REFERENCE TO RELATED APPLICATIONS

The present application is a continuation of U.S. patent application Ser. No. 16/446,953, filed Jun. 20, 2019, which is a continuation of U.S. patent application Ser. No. 15/922,179, filed Mar. 15, 2018, now U.S. Pat. No. 10,369,518, which claims the benefit of U.S. Provisional Patent Application No. 62/473,228, filed Mar. 17, 2017, the disclosures of which are incorporated herein by reference in their entireties.

TECHNICAL FIELD

The present disclosure relates generally to the field of calcium hydroxide-containing compositions and associated systems and methods. The calcium hydroxide-containing compositions may be used for the treatment and/or removal of exhaust gases.

BACKGROUND

Exhaust gases may be released as a result of combustion (e.g., of fossil fuels or other fuel sources) or from other chemical reactions or processes. Such gases often include complex chemical mixtures, and can include one or more chemical species that pose significant environmental risks and are subject to regulation by governments or other organizations. More particularly, an exhaust gas may include one or more acidic species, such as halogenated acids (e.g., HCl, HF, and HBr), sulfur dioxide ($SO_2$), sulfur trioxide ($SO_3$), and sulfuric acid ($H_2SO_4$), amongst other acidic species. Such species can be toxic and/or contribute to acid rain, and must therefore be treated. Exhaust gas can also include a plurality of other chemicals (e.g., arsenic and/or selenium) which can affect manufacturing process conditions by fouling catalysts (e.g., SCR catalysts) and downstream equipment.

Current methods for treating an exhaust gas and such contaminants commonly include contacting the exhaust gas with calcium hydroxide (e.g., hydrated lime or lime hydrate) particles. For example, sulfur-containing gases can be removed from a stream of exhaust gas by reacting calcium hydroxide with gaseous sulfur trioxide to form solid calcium sulfate according to the following reaction:

$$SO_3(g)+Ca(OH)_2(s) \rightarrow Ca(SO_4)(s)+H_2O(g)$$

Hydrated lime systems utilizing calcium hydroxide particles are commonly used in operations for continuously treating exhaust gases and removing acidic species.

One challenge commonly associated with these hydrated lime systems is their relative inefficiency with capturing acidic species from an exhaust gas stream. This inefficiency is due in part to the difficulty of effectively dispersing the calcium hydroxide particles quickly enough within the ducting through which the exhaust stream travels so that the particles can contact the acidic species in the exhaust gases. For example, in those hydrated lime systems that use fine calcium hydroxide particles (e.g., particles with diameters less than 8 microns) with a narrow particle size distribution, the dispersion of those particles within an exhaust ducting can be limited, and often fails to contact sulfur-containing gases at, e.g., the outer edges of the ducting in systems with short residence times. As another example, in those hydrated lime systems that use coarse particles (e.g., particles with diameters above 30 microns), the reactivity of those particles is limited because of their lower surface area to volume ratios, relative to finer particles. In addition to these particle size constraints of fine and coarse, the removal efficiency of calcium hydroxide particles can further be based on the particle surface area, particle size distribution, pore volume, and moisture content, amongst other factors. Accordingly, there exists a need for an improved composition of calcium hydroxide particles to more efficiently remove contaminants from exhaust gases.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
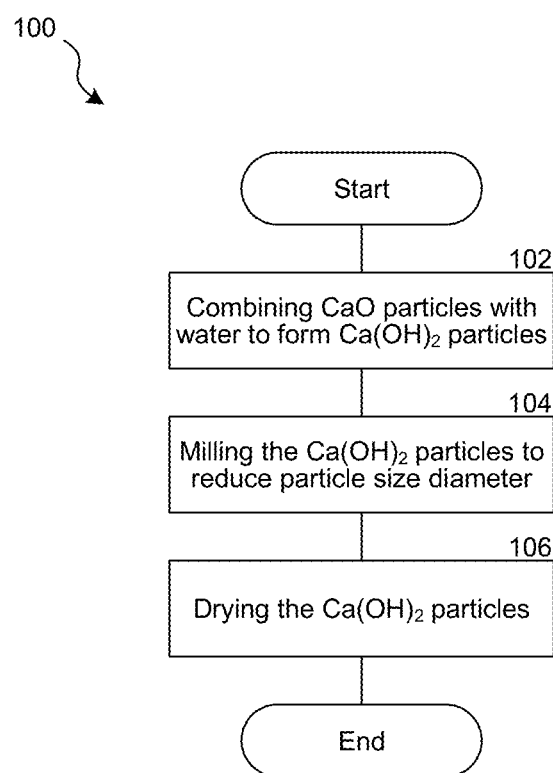
FIG. 1 is a flow diagram illustrating a process for forming a hydrated lime product, configured in accordance with embodiments of the present technology.

The present disclosure relates to compositions that include calcium hydroxide ($Ca(OH)_2$) particles, and to methods for preparing and using such compositions. The compositions can be used for the treatment of exhaust gases. As discussed above, there exists a need to efficiently remove contaminants (e.g., acid gases, heavy metals, etc.) from exhaust gases using calcium hydroxide particles. Accordingly, several embodiments of the present technology are directed to compositions having characteristics that result in improved removal and treatment of contaminants in the exhaust gas. In some embodiments, for example, the composition for treating acid gases can include a $D_{10}$ from about 0.5 microns (μm) to about 4 microns, a $D_{90}$ less than about 30 microns, a ratio of $D_{90}$ to $D_{10}$ from about 8 to about 25, and a flow factor index above about 2, or from about 2 to about 6.

It will be readily understood that the embodiments, as generally described herein, are exemplary. The following detailed description of various embodiments is not intended to limit the scope of the present disclosure, but is merely representative of various embodiments. It will be appreciated that various features are sometimes grouped together in a single embodiment or description thereof for the purpose of streamlining the disclosure. Many of these features may be used alone and/or in combination with one another. Moreover, the order of the steps or actions of the methods disclosed herein may be changed by those skilled in the art without departing from the scope of the present disclosure. In other words, unless a specific order of steps or actions is required for proper operation of the embodiments, the order or use of specific steps or actions may be modified. Furthermore, sub-routines or only a portion of a method described herein may be a separate method within the scope of this disclosure. Stated otherwise, some methods may include only a portion of the steps described in a more detailed method.

Definitions

As used herein, the Dx value of a sample of particles is the diameter at which X % of the sample is of particles having a diameter below the specified value. For example, the $D_{10}$ value of a sample of particles is the diameter at which 10% of the sample's volume is from particles that have a diameter that is less than the $D_{10}$ value. Similarly, the $D_{90}$ value of a sample of particles is the diameter at which 90% of the sample's volume is from particles that have a diameter that is less than the $D_{90}$ value. Unless otherwise specified, all ranges include both endpoints.

Compositions

One aspect of this disclosure relates to compositions for the treatment of an exhaust gas, such as flue gas from a power plant, cement plant, industrial boiler or other industrial process. In some embodiments, the composition includes a plurality of particles that include calcium hydroxide ($Ca(OH)_2$). In some embodiments, the plurality of particles are between about 90% and about 98% calcium hydroxide by weight, between about 90% and about 96%, between about 92% and about 96%, or between about 93% and about 96%.

Particles described herein may have a varying size and/or shape. In some embodiments, for example, the particles are substantially spherical. In some embodiments, the particles include a distribution of diameters such that the difference between the major diameter (or maximum diameter) and the minor diameter (or minimum diameter) is less than about 20%, less than about 15%, less than about 10%, or less than about 5%.

In some embodiments, the particles of the composition may have a varying size distribution. For example, in some embodiments, between about 25% and about 50% of the volume of the plurality of particles is in particles that have a diameter between about 4 microns and about 10 microns. For example, in some embodiments, the volume of the plurality of particles having a diameter between about 4 microns and about 10 microns is between about 25% and about 50%, between about 30% and about 45%, between about 30% and about 40%, and/or between about 33% and about 40%. In some embodiments, the plurality of particles have a $D_{10}$ that is from about 0.5 microns to about 4.0 microns. For example, in some embodiments, the $D_{10}$ of the plurality of particles is between about 1.0 and about 4.0, between about 1.5 and about 4.0, and/or between about 1.8 and about 3.6. In some embodiments, the plurality of particles have a $D_{90}$ that is from about 15 microns to about 50 microns. For example, in some embodiments, the plurality of particles have a $D_{90}$ of between about 20 microns and about 50 microns, between about 20 microns and about 40 microns, between about 20 microns and 30 microns, between 25 microns and 30 microns, and/or less than about 30 microns.

In some embodiments, the $D_{90}$, the $D_{93}$, and/or the $D_{95}$ are less than about 50 microns. In some embodiments, the $D_{90}$, the $D_{93}$, and/or the $D_{95}$ are less than about 30 microns. In some embodiments, the $D_{50}$ is between about 6 microns and about 10 microns, such as between about 6 microns and about 9 microns, or between about 7 microns and about 9 microns.

In some embodiments, the ratio of $D_{90}/D_{10}$ (i.e., the "steepness" of the plurality of particles) is between about 8 and about 25, between about 8 and about 15, between about 8 and about 12, and/or between about 9 and about 11. Steepness may be understood as a measure of uniformity of particle size. Stated differently, particles with a relatively uniform particle size tend to have a relatively low ratio of $D_{90}/D_{10}$.

In addition to particle size distribution, the composition can also have a particular particle size. In some embodiments, finer particles may, as a whole, react more efficiently with one or more chemical species from an exhaust gas, compared to coarser particles. In some embodiments, coarse particles can be characterized as being above about 32 microns, and fine particles can be characterized as being below about 8 microns. Finer particles, because of their decreased size and higher surface area to volume ratio, have a generally higher reactivity with the gas stream being treated. Finer particles, though, also can have less desirable flow characteristics which limit their dispersion ability when injected as a sorbent within a gas stream. Finer particles can also inhibit the flow of material through silos to process feed equipment which could result in inconsistent performance. Coarser particles can exhibit, in part, opposite characteristics, and can have their own advantages and disadvantages. For example, coarser particles can have some more desirable dispersion characteristics, due to the momentum difference of coarser particles compared to finer particles, but can also have less reactivity, due to their decreased surface area to volume ratio. For these reasons, a broader range of particle sizes can enhance dispersion, thereby allowing for more complete contact of the sorbent with contaminants in the gas stream, as well as improve the flow characteristics (e.g., flowability) of the sorbent in silo systems. In addition to particle size and particle size distribution, factors affecting flowability can include particle shape, agglomeration of particles, surface irregularities, and moisture content.

Given the advantages and disadvantages associated with both coarse and fine particles, embodiments of the present technology discloses an optimal distribution of coarse and fine particles (e.g., based on particle size distribution or $D_{90}/D_{10}$ ratios) to provide enhanced removal efficiency relative to conventional compositions. Stated otherwise, depending on various needs of a facility, a composition's particle size and $D_{90}/D_{10}$ ratio can be optimized according to embodiments of the present disclosure to enhance reactivity by increasing the flowability and/or dispersion characteristics of the composition, and thereby more effectively treat acidic species of a gas/exhaust stream.

Generally speaking, the flowability of a composition (e.g., in a silo) is based on factors including consolidation stress of the composition, bulk density (e.g., mass of the composition divided by total volume) of the composition at the corresponding consolidation stress, effective angle of internal friction (e.g., the friction between sliding layers of the composition/material being measured), and/or a dimension of the opening (e.g., at the bottom of a silo) through which the composition flows. In some embodiments, flowability can be measured by determining a relationship between an unconfined failure strength (kPa) of the composition and the major principal consolidating stress (kPa) of the composition, with the unconfined failure strength being the vertical force on the composition in a perpendicular direction, and the major principal consolidating stress being the horizontal stress on the unconfined composition. In addition to or in lieu of the foregoing, the unconfined failures strength can be characterized as the stress required to cause the composition to flow at a stress-free surface, and the major principal consolidating stress can be characterized as the largest or primary stress acting on the composition in the silo. Individual measurements of the unconfined failure strength and major principal consolidating stress can be measured at a variety of data points via a Powder Flow Tester, such as the PFT™ Powder Flow Tester manufactured by AMETEK Brookfield of Middleboro, Mass. The measurements can then be used to develop a relationship (e.g., a flow index or slope) between the unconfined failure strength (y-axis) and major principle consolidation stress plotted (x-axis). The flow factor index of the composition can be determined by calculating the inverse value of the flow index or slope. The flow factor index of a composition can provide a baseline against which to compare alternative compositions. Flowability characteristics can be generally characterized by the flow factor index according to Table 1:

TABLE 1

| Flowability Characteristics | Flow Factor Index (ff) |
| --- | --- |
| Non Flow | ff < 1 |
| Very Cohesive | 1 < ff < 2 |
| Cohesive | 2 < ff < 4 |
| Easy Flowing | 4 < ff < 10 |
| Free Flowing | 10 < ff |

Other factors affecting flowability of a composition can include mean particle size, particle size distribution (e.g., steepness), particle shape, agglomeration of particles, surface irregularities of individual particles, and moisture content. In some embodiments, the flow factor indexes for the compositions described herein are above 2, and/or can vary from about 2 to about 6, from about 2 to about 4, or from about 2 to about 3.

In some embodiments, the plurality of particles comprise one or more pores. For example, in some embodiments, the plurality of particles have an average pore volume of at least about 0.1 cm$^3$/g. In some embodiments, the plurality of particles have an average pore volume of between about 0.1 cm$^3$/g and about 0.25 cm$^3$/g, such as between about 0.1 cm$^3$/g and about 0.20 cm$^3$/g, and/or between about 0.1 cm$^3$/g and between about 0.14 cm$^3$/g.

The effective surface area of particles is dependent on pore size. Reactions in pores with small openings could plug the openings and prevent full utilization of the full surface area of the particle. In some embodiments, each particle of the plurality of particles has, on average, a plurality of pores having a diameter of between 100 angstroms and 400 angstroms. The pores of the plurality of particles may have diameters small enough to increase the surface area of the particles (e.g., relative to particles without pores), but be large enough so as to not become readily "clogged" or "plugged" with exhaust gas material.

In some embodiments, the plurality of particles have an average surface area of greater than about 25 m$^2$/g. For example, the surface area of the plurality of particles may be between about 25 m$^2$/g and about 50 m$^2$/g, between about 35 m$^2$/g and about 50 m$^2$/g, and/or between about 35 m$^2$/g and about 45 m$^2$/g. Surface area can be measured by equipment that uses gas sorption techniques described in "Adsorption of Gases in Multimolecular Layers" by Braunauer, Emmett, and Teller, which is incorporated herein by reference in its entirety.

In some embodiments, the plurality of calcium hydroxide particles have a CO$_2$ content of less than about 4%, less than about 3%, and/or less than about 2%. In some embodiments, the particles have a CO$_2$ content of between about 1% and about 3%, between about 1% and about 2.5%, or between about 1% and about 2%.

In some embodiments, the plurality of particles have a loose density of between about 15 lb/ft$^3$ and about 25 lb/ft$^3$, between about 20 lb/ft$^3$ and about 25 lb/ft$^3$, or between about 22 lb/ft$^3$ and about 24 lb/ft$^3$. In some embodiments, the plurality of particles have a packed density of between about 28 lb/ft$^3$ and about 34 lb/ft$^3$, between about 29 lb/ft$^3$ and about 33 lb/ft$^3$, between about 30 lb/ft$^3$ and about 32 lb/ft$^3$.

In some embodiments, the plurality of calcium hydroxide-containing particles are used in combination with one or more other sorbents. Sorbents can be, for example, sodium based (e.g., sodium bicarbonate) or activated carbon. Stated differently, some compositions for treating exhaust gas may include a combination of one or more other sorbents that differ from the particles that contain calcium hydroxide.

In some embodiments wherein compositions have been dried via exposure to a heated gas (e.g., heated atmospheric air), the composition of the plurality of particles may have a moisture content of less than about 1%, less than 0.75%, and/or less than 0.5% by weight. In other embodiments, the moisture content may be higher than about 1%, such as between about 2% and about 3% by weight.

In some embodiments, the composition of the plurality of particles is distributed to directly contact an exhaust gas. For example, the composition can be injected into the flue gas duct work. In other embodiments, the composition can also be dispersed within a pollution control device, such as a scrubber (e.g., a circulating dry scrubber, a wet scrubber, or conditioning chamber).

Methods of Use

The compositions described above may be used to treat exhaust gases. For example, in some instances, a composition, such as the composition described above, may be contacted with an exhaust gas. One or more chemical species of the exhaust gas may interact with the calcium hydroxide of the particles.

In some embodiments, the chemical species adsorbs to the surface of the particle via physisorption (e.g., van der Waals forces) and/or chemisorption (e.g., via covalent or ionic bonding). For example, in some embodiments, one or more contaminants of the exhaust gas react with the calcium hydroxide (a base) to form a salt. In some embodiments, the salt is a solid under the reaction conditions and is thereby removed from the stream of exhaust gas. Moisture content of the particle may also aid the absorption and removal of contaminants and/or acidic species, such as sulfur dioxide (SO$_2$).

In some embodiments, the plurality of particles are placed in contact with the exhaust gas via dispersion. For example, a pressurized gas such as compressed air (or some other source of force) may be used to cause the particles to disperse (e.g., form a mist of particles) into ducting (e.g., flue gas ducting) and contact the stream of exhaust gas. As previously described, the composition of the present disclosure can include a combination of coarse and fine particles that have beneficial flowability characteristics. The coarse particles have greater momentum and travel further distances, and the finer particles have higher surface area to volume ratio and reactivity. As such, the combination of coarse and fine particles, when injected and dispersed over an exhaust gas in a ducting area, can substantially cover (e.g., cover a majority of) a cross-sectional surface area of the ducting, including both near and far ends of the ducting relative to the dispersion point, and better ensure the exhaust gas traveling therethrough is contacted by calcium hydroxide particles of the composition. The exhaust gas may react with the particles, and the resulting solids may then be collected in a collection bin or other container. In some embodiments, the resulting solid particles are collected in an electrostatic precipitator (ESP) or a baghouse. In some embodiments, the exhaust gas is passed through a wet scrubber that includes particles comprising calcium hydroxide. Prior to sorbent injection, the flue gas can also be humidified to enhance the removal efficiency of the calcium hydroxide particles. The particles may subsequently be removed from the pollution control device. In some embodiments, calcium hydroxide is placed in contact with one or more reactive species of the exhaust gas (e.g., $SO_2$, $SO_3$ and/or HCl) by introducing (e.g., injecting) the calcium hydroxide into the stream of exhaust gas. In some embodiments, the particles comprising calcium hydroxide are co-injected into a stream of exhaust gas with one or more other sorbents. In some embodiments, the exhaust gas is from a power plant, paper mill, cement facility or chemical/industrial process.

Methods of Manufacture

FIG. 1 is a flow diagram illustrating a process 100 for forming calcium hydroxide-containing particles, in accordance with embodiments of the present technology. As shown in process portion 102, particles comprising calcium oxide (CaO) may be combined with water (i.e., slaked) to form particles comprising calcium hydroxide. In some embodiments, the particles comprising calcium oxide are combined with water at a ratio of between about 1:0.7 and/or about 1:3 by weight. In some embodiments, the quicklime has a reactivity to water greater than 24.0° C. in 30 seconds (as measured by ASTM C110 Slaking Rate of Quicklime procedure). In some embodiments, water is added to the quicklime such that the slaked calcium hydroxide particles have a residual moisture content of between about 10% and about 30% by weight, such as between about 15% and about 30% by weight, and/or between about 17% and about 23% by weight. In some embodiments, the slaking of quicklime occurs in a hydrator (e.g., a three-stage hydrator). The quicklime particles can range from fine dust-like particles to particles that are over 9 mm in diameter.

In some embodiments, the quicklime may be slaked in the presence of one or more additives, such as ethylene glycol, diethylene glycol, triethylene glycol, monoethanolamine, diethanolamine, triethanolamine, sodium or calcium lignosulfonate and/or combinations thereof. Stated differently, particles that include calcium oxide may be combined with water in the presence of the one or more additives. In some embodiments, one or more of these additives may inhibit "clumping" or the formation of relatively large calcium hydroxide aggregates. In other words, such additives may result in an improved particle size distribution. In some embodiments, the addition of one or more additives may additionally or alternatively result in a more thoroughly hydrated calcium product. In addition to or in lieu of the foregoing, one or more additives can also be added to the calcium hydroxide particles after the hydrator to help negate a charge associated with the calcium hydroxide particles, improve particle dispersion and/or improve flowability in a silo, as previously described. Furthermore, the one or more additives can be incorporated into the process at other stages of manufacturing (e.g., before, during and/or after milling). In some embodiments, the one or more additives are present in the quicklime/water mixture at a concentration of between about 0.1% and about 1.5% by weight. In some embodiments, the additive is added at a concentration of about 0-2% by mass of added water. In some embodiments, no additives are used. Stated differently, in some embodiments, the calcium oxide-containing quicklime is slaked in the absence of the additives described herein. In some embodiments, mixture of quicklime and water in a hydrator is mixed at a speed of between about 20 rpm and about 100 rpm, such as between about 50 rpm and about 75 rpm or between about 55 rpm and about 65 rpm. In some embodiments, a variable frequency drive is coupled to the hydrator to control rpm output.

After the quicklime has been slaked (i.e., the particles comprising calcium oxide have been combined with water), the resulting calcium hydroxide-containing material may be milled to reduce its particle size diameter (process portion 104). For example, in some embodiments, the calcium hydroxide-containing material is placed in a grinding mill or impact mill that results in a steepness ratio greater than about 8. One or more members within the impact mill may then be rotated to cause collisions between the calcium hydroxide-containing particles. In this manner, the aggregates and/or large calcium hydroxide particles may be milled, ground, or otherwise modified to produce calcium hydroxide particles that are smaller in size. In some embodiments, the abrasive forces within the impact mill may render the particles more uniform in size. Stated differently, in some embodiments, the steepness (i.e., the $D_{90}/D_{10}$ ratio) for the calcium hydroxide particles can correlate to a residence time spent in the impact mill and may decrease as a result of "milling."

Various parameters of the impact mill may be modified to obtain particles having the desired attributes. For example, in some embodiments, a variable frequency drive speed may be utilized. In some embodiments, the speed (e.g., from 45% speed to 100% speed) and/or the number of members may be modified.

In some embodiments, the calcium hydroxide particles may be dried (process portion 106). In some embodiments, the calcium hydroxide particles can be dried prior to and/or during milling and separation from the flue gas. Stated differently, in some embodiments, both drying and milling of the particles that comprise calcium hydroxide can be simultaneously occurring. In some embodiments, drying of the calcium hydroxide particles involves indirect heating of the calcium hydroxide particles. For example, the calcium hydroxide particles may be indirectly heated with a heated gas, such as atmospheric air, that has a temperature of between about 150° C. and about 425° C., such as between about 200° C. and about 400° C., between about 200° C. and about 375° C., between about 250° C. and about 320° C., and/or between about 350° C. and about 400° C.

In some embodiments, the particles comprising calcium hydroxide may be sieved, filtered or otherwise modified (e.g., via an air classifier or a cyclone) prior to the finished product bin and use. For example, in some embodiments, the particles are sieved through mesh having a pore size of about 600 microns, about 300 microns, about 150 microns, about 75 microns, about 45 microns, or about 32 microns. In other embodiments, the particles comprising calcium hydroxide are not sieved prior to use in removing one or more chemical species from an exhaust gas.

The resulting particles may have any of the features or characteristics described herein. For example, in some embodiments, the resulting particles have one or more of the following characteristics: a steepness of between 8 and 20; a $D_{10}$ of less than or equal to 4 microns; and/or a $D_{90}$ of between 15 microns and 40 microns. These characteristics are only exemplary in nature. In other embodiments, the resulting particles have other characteristics, as described herein.

Example 1—Manufacture of Calcium Hydroxide-Containing Particles

Various batches of calcium hydroxide-containing particles described herein were manufactured by slaking quicklime. Data for the resulting particles from batches 1M-10M are shown in Table 2, which includes $Ca(OH)_2$ % by weight, $CO_2$ % by weight, pore size, pore volume, surface area, % moisture by weight and particle size steepness. Quicklime particles having a calcium oxide content of approximately 92-95% by weight were slaked by the addition of water at a ratio of about 1:0.9 quicklime to water by weight to form calcium hydroxide. In some batches, an amine or glycol based additive or combinations thereof was included in the slaking mixture. For example, batches 6M and 9M included at least one amine-based additive at approximately 0.1-4% by weight, and batches 7M and 8M included at least one glycol-based additive at approximately 0.1-4% by weight. In some batches, the quicklime particles were less than 5 mm in diameter. In other batches, approximately up to 5% of the quicklime particles were greater than 5 mm in diameter. The slaked calcium hydroxide particles had a residual moisture content between 10% and 30% by weight. The slaked particles were then simultaneously dried and milled in a grinding or impact mill.

TABLE 2

| Batch | $Ca(OH)_2$ % by weight | $CO_2$ % by weight | Pore size (Å) | Pore volume ($cm^3/g$) | Surface Area ($m^2/g$) | % Moisture (by weight) | Particle Size Steepness $D_{90}/D_{10}$ |
|---|---|---|---|---|---|---|---|
| 1M | 95.92 | 1.93 | 137.7763 | 0.145100 | 42.1261 | 0.43 | 8.7 |
| 2M | 96.18 | 1.75 | 148.2686 | 0.163972 | 44.2365 | 0.62 | 9.9 |
| 3M | 93.58 | 1.85 | 150.3957 | 0.158322 | 42.1081 | 0.60 | 7.3 |
| 4M | 94.54 | 1.80 | 145.9487 | 0.153359 | 42.5346 | 0.63 | 9.7 |
| 5M | 95.31 | 1.88 | 157.2201 | 0.172826 | 43.9705 | 0.63 | 10.1 |
| 6M | 92.72 | 2.77 | 103.8980 | 0.115066 | 44.2996 | 0.30 | 9.1 |
| 7M | 93.53 | 2.78 | 114.5121 | 0.136375 | 47.6370 | 0.56 | 9.2 |
| 8M | 95.42 | 2.96 | 124.1555 | 0.156210 | 50.3273 | 0.65 | 10.7 |
| 9M | 94.69 | 2.77 | 125.8219 | 0.153785 | 48.8898 | 0.45 | 14.9 |
| 10M | 94.30 | 2.36 | 123.3994 | 0.150960 | 48.9338 | 0.63 | 11.9 |

Figure 2:
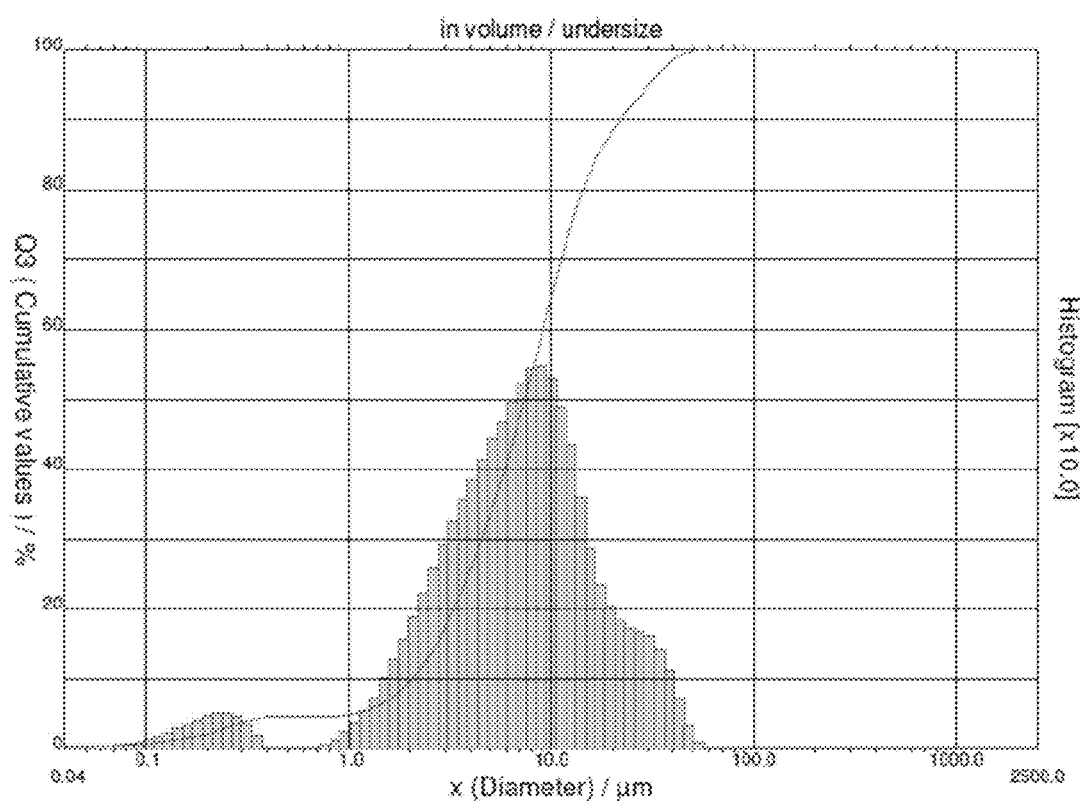
FIGS. 2-4 are particle size histograms for exemplary compositions of calcium hydroxide particles, configured in accordance with embodiments of the present technology.
Figure 3:
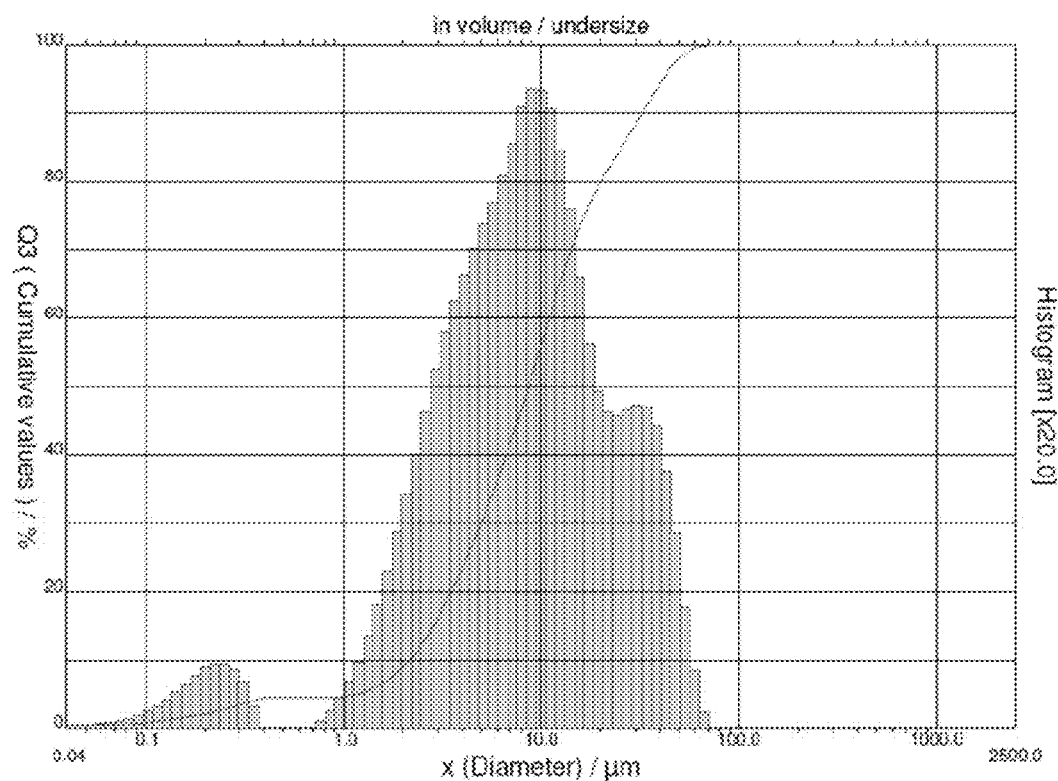
Figure 4:
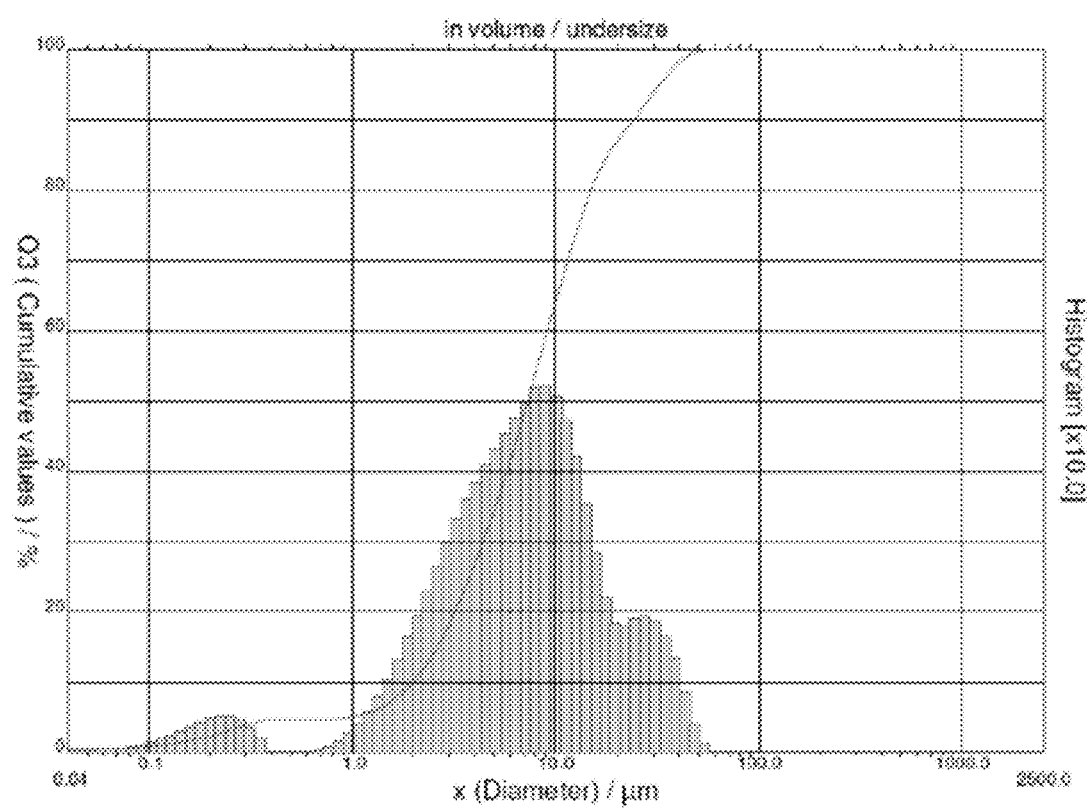

The size distributions of particles from the various batches were analyzed by laser diffraction. The results from batches 8M, 9M and 10M are shown in FIGS. 2, 3 and 4 respectively. FIG. 2 shows the size distribution of 8M particles, FIG. 3 shows the size distribution of 9M particles, and FIG. 4 shows the size distribution of 10M particles. FIGS. 2-4 show the volume density and cumulative volume as a percentage of the total volume of the distribution for each batch. The curves on each of FIGS. 2-4 show the percent of cumulative volume at each diameter. Stated differently, the curves show the amount of the sample (by volume) that is in particles having a diameter at or below the specified value. Additional information regarding the particles of FIGS. 2-4 is set forth in Table 3.

TABLE 3

| Batch | $D_{10}$ (microns) | $D_{50}$ (microns) | $D_{90}$ (microns) | $D_{90}/D_{10}$ | Mean diameter (microns) |
|---|---|---|---|---|---|
| 8M | 2.06 | 7.41 | 22.07 | 10.71 | 10.00 |
| 9M | 2.18 | 8.67 | 32.44 | 14.88 | 12.97 |
| 10M | 2.01 | 7.37 | 24.00 | 11.94 | 10.25 |

Example 2—Evaluation of Modified Hydrated Lime

Testing to evaluate the relative performance of conventional hydrated lime and the modified hydrated lime described herein was performed at a small scale boiler designed to simulate the equipment, time and temperature profiles of a full-scale coal-fired power facility. A bituminous coal with a sulfur content between 2.5-2.75% was used as the fuel source in the boiler for this set of evaluations. Sorbent injection tests were run to evaluate the effectiveness of the conventional and modified hydrated lime product at removing $SO_2$, $SO_3$ and HCl from the flue gas stream. Testing conditions for the furnace included a heat input of 3.4 MMBTU/hr, a furnace exit oxygen of 3%, and a coal feed rate of approximately 270 lb/hr. Fourier transformed infrared spectroscopy (FTIR) measurements at the inlet to an ESP were used to determine removal efficiency.

A first series of tests involved the injection of the conventional and modified hydrated lime to examine the removal of $SO_2$ from the flue gas. The product was injected prior to the air preheater where the flue gas temperature was approximately 600° F. The hydrated lime products were injected at stoichiometric ratios of Ca:S at about 1.3:1 and about 2.1:1. As shown in Table 4, use of the modified hydrated lime improved the $SO_2$% reduction per Ca:S. At stoichiometric ratios of Ca:S at 1.3:1, the modified hydrated lime was over 40% more effective in removing $SO_2$ compared to the conventional hydrated lime. At stoichiometric ratios of Ca:S at 2.1:1, the modified hydrated lime was over 30% more effective in removing $SO_2$ compared to the conventional hydrated lime.

TABLE 4

| | $SO_2$ Reduction per Ca:S Ratio | | |
|---|---|---|---|
| Product | 1.3:1 | 2.1:1 | Average |
| Conventional Hydrated Lime | 12.2% | 13.7% | 13.0% |
| Modified Hydrated Lime | 17.4% | 16.8% | 17.1% |

A second series of tests involved the injection of the conventional and modified hydrated lime to examine the removal of $SO_3$ from the flue gas. The product was injected prior to the air preheater at a point where flue gas temperature was approximately 600° F. $SO_3$ is more easily removed by lime compared to $SO_2$, and thus the lime dosage was reduced significantly from the first series of tests to measure the differences between the conventional and modified hydrated lime products. As shown in Table 5, at an injection rate of 1 lb/hr, or a Ca/S stoichiometric ratio of 0.06:1, the modified hydrated lime product was over 75% more effective at removing $SO_3$ than the conventional hydrated lime product.

TABLE 5

| Product | SO$_3$ Reduction per Ca:S Ratio of 0.06:1 |
| --- | --- |
| Conventional Hydrated Lime | 25.8% |
| Modified Hydrated Lime | 45.4% |

A third series of tests involved the injection of the conventional and modified hydrated lime to examine the removal of HCl from the flue gas. The product was injected after the air preheater at a point where flue gas temperature is approximately 350° F. This temperature after the air preheater has been found to be optimal for HCl removal from flue gas. As shown in Table 6, two injection rates, 0.33:1 and 1.4:1 of Ca/S, were studied. At the lower injection rate of 0.33:1, the modified hydrated lime was over 120% more effective at removing HCl compared to the conventional hydrated lime sample. At the higher injection rate of 1.4:1, the modified hydrated lime product removed 99.4% of the HCl compared to 87.5% when using the conventional lime. The 99.4% removal could have been complete removal of HCl, given the range of variation of the study. Though the difference between the modified and controlled lime hydrates was only 13.6% at the higher injection rate, it is likely that the dosage of the modified hydrated lime could be lowered with similar performance.

TABLE 6

| | HCl Reduction per Ca:S Ratio | |
| --- | --- | --- |
| Product | 0.33:1 | 1.4:1 |
| Conventional Hydrated Lime | 20.9% | 87.5% |
| Modified Hydrated Lime | 46.2% | 99.4% |

Example 3—Evaluation of Flowability of Modified Hydrated Lime

Testing was performed to evaluate the relative performance of fine hydrated lime and the modified hydrated lime described herein. Each of the fine hydrated lime and modified hydrated lime samples were tested on a Brookfield-Powder Flow tester, a Cilas-1190LD Particle Size Analyzer, and a Micromeritics-TriStar BET Surface Area Analyzer. As shown in Table 7, the fine hydrated lime tested included a smaller mean diameter and a lower particle size distribution (i.e., $D_{90}/D_{10}$ ratio) relative to that of the modified hydrated lime. The flow factor index of the modified hydrated lime was determined to be approximately 25% greater than that of fine hydrated lime. The modified hydrated lime also had a significantly greater specific surface relative to that of the fine hydrated lime, thereby providing better reactivity as well.

TABLE 7

| | Critical Arching Values | | | | | | Specific |
| --- | --- | --- | --- | --- | --- | --- | --- |
| Product | Stress (kPa) | Angle of Internal Friction (°) | Silo Opening (m) | Flow Factor Index | Mean Diameter | $d_{90}/d_{10}$ | Surface Area (m$^2$/g) |
| Fine Hydrated Lime | 1.453 | 56.0 | 0.591 | 1.79 | 7.6 | 7.6 | 31.03 |
| Modified Hydrated Lime | 0.890 | 53.4 | 0.395 | 2.27 | 9.8 | 8.7 | 42.12 |

It will be apparent to those having skill in the art that changes may be made to the details of the above-described embodiments without departing from the underlying principles of the present disclosure. In some cases, well-known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded. Additionally, the term "about," when preceding a value, should be interpreted to mean plus or minus 10% of the value, unless otherwise indicated. Additionally, the term "substantially" should be interpreted to mean a majority of.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A method for treating an acid-containing gas stream, the method comprising:
   providing calcium hydroxide particles, individual calcium hydroxide particles comprising a moisture content no more than about 3.0% and a pore volume or porosity of at least about 0.1 cm$^3$/g, wherein—
      about 90% of the calcium hydroxide particles comprise a cross-sectional dimension equal to or less than a first cross-sectional dimension,
      about 10% of the calcium hydroxide particles comprise a cross-sectional dimension equal to or less than a second cross-sectional dimension different than the first cross-sectional dimension, and
      a ratio of the first cross-sectional dimension to the second cross-sectional dimension is from about 8-25; and
   dispersing the particles within a pollution control device, thereby causing at least some of the particles to directly contact the gas stream.

2. The method of claim 1, wherein the pollution control device comprises a circulating dry scrubber.

3. The method of claim 1, wherein the pollution control device comprises a wet scrubber.

4. The method of claim 1, wherein the pollution control device comprises a conditioning chamber, and wherein dispersing the particles comprises injecting the parties into ductwork.

5. The method of claim 1, wherein the specific surface area of the individual calcium hydroxide particles is at least about 30 m$^2$/g.

6. The method of claim 1, wherein the specific surface area of the individual calcium hydroxide particles is less than about 50 m$^2$/g.

7. The method of claim 1, wherein the specific surface area of the individual calcium hydroxide particles is from about 35-45 m$^2$/g.

8. The method of claim 1, wherein the first cross-sectional dimension is less than about 30 microns.

9. The method of claim 1, wherein the second cross-sectional dimension is from about 1-4 microns.

10. The method of claim 1, wherein:
    the first cross-sectional dimension is from about 15-50 microns, and
    the second cross-sectional dimension is from about 1-4 microns.

11. The method of claim 1, wherein about 50% of the calcium hydroxide particles comprise a third cross-sectional dimension less than about 10 microns.

12. The method of claim 1, wherein the flow factor of the calcium hydroxide particles is from about 2-4.

13. The method of claim 1, wherein dispersing the particles comprises dispersing a composition including the particles, the particles comprising at least about 90% by volume of the composition.

14. The method of claim 1, wherein the calcium hydroxide particles comprise a loose density of from about 15-25 lb/ft$^3$ and a packed density of from about 28-34 lb/ft$^3$.

15. A method for treating an exhaust gas, the method comprising:
    providing a pollution control device positioned to receive a composition comprising a plurality of calcium hydroxide particles, at least a portion of the calcium hydroxide particles comprising a specific surface area of from about 25-50 m$^2$/g and a moisture content of no more than about 3.0%, wherein (i) 90% of the calcium hydroxide particles are less than a first cross-sectional dimension, (ii) 10% of the calcium hydroxide particles are less than a second cross-sectional dimension, and (iii) a ratio of the first cross-sectional dimension to the second cross-sectional dimension is less than 25, and wherein the calcium hydroxide particles comprise at least about 90% by volume of the composition; and
    dispersing the composition from the pollution control device, thereby enabling the calcium hydroxide particles to absorb acid species from the exhaust gas.

16. The method of claim 15, wherein the pollution control device comprises a circulating dry scrubber.

17. The method of claim 15, wherein the pollution control device comprises a wet scrubber.

18. The method of claim 15, wherein the pollution control device comprises a conditioning chamber.

19. The method of claim 15, wherein the first cross-sectional dimension is less than about 50 microns, and the second cross sectional dimension is about 4 microns.

20. The method of claim 15, wherein about 50% of the calcium hydroxide particles comprise a third cross-sectional dimension less than about 10 microns.

* * * * *